F. L. H. SIMS.
KEY BOLT.
APPLICATION FILED JUNE 14, 1909.
1,000,445.
Patented Aug. 15, 1911.
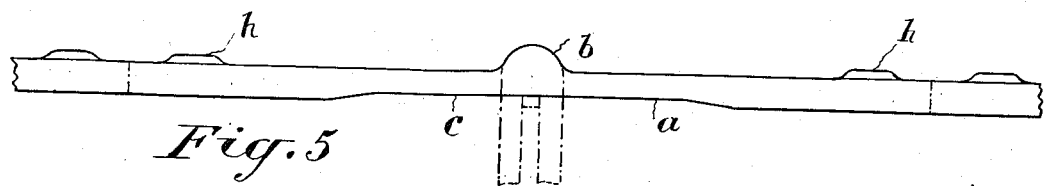
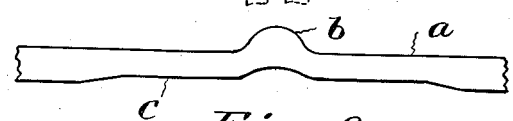
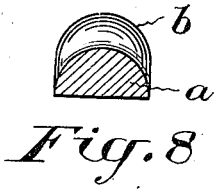
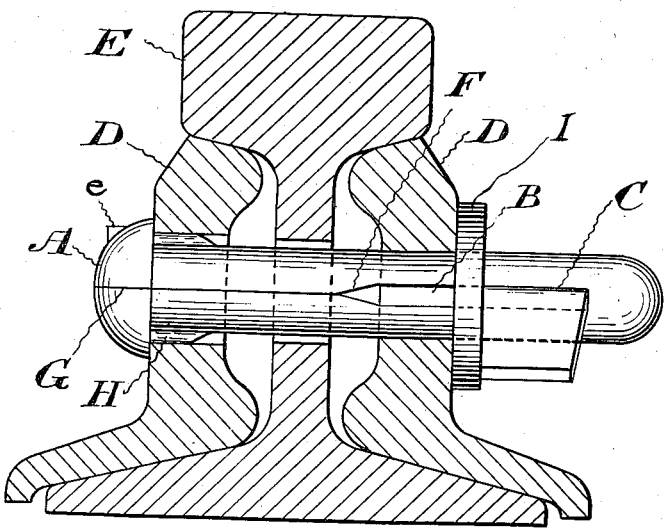
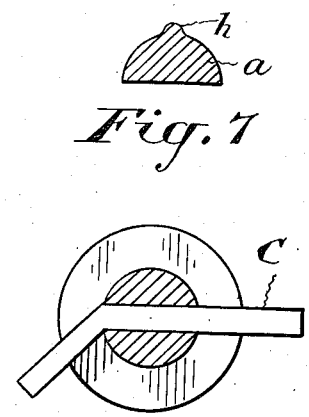
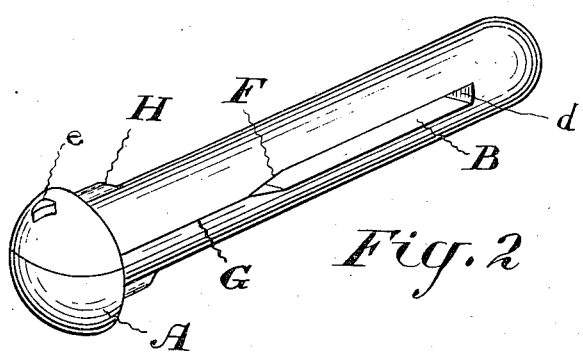
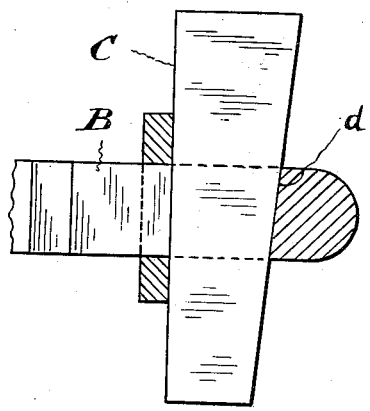
WITNESSES:
INVENTOR.
Frederick L. H. Sims
BY Ridout & Maybee
ATTORNEYS

UNITED STATES PATENT OFFICE.

FREDERICK L. H. SIMS, OF GEORGETOWN, ONTARIO, CANADA, ASSIGNOR TO FLORENCE SIMS, OF GEORGETOWN, CANADA.

KEY-BOLT.

1,000,445.  Specification of Letters Patent.  Patented Aug. 15, 1911.

Application filed June 14, 1909. Serial No. 502,089.

*To all whom it may concern:*

Be it known that I, FREDERICK L. H. SIMS, of the village of Georgetown, in the Province of Ontario, Canada, have invented certain new and useful Improvements in Key-Bolts, of which the following is a specification.

This invention relates to bolts of the type with which a key passing through a slot in the bolt is used instead of a nut.

As a key may be so arranged if desired as to make it practically impossible for it to become loose as nuts invariably do when used in rail joints, key bolts possess a great advantage in this respect over nut bolts, but the expense of manufacture has hitherto prevented their use in large quantities and my object is to devise a key bolt which may be so cheaply constructed that the bolt, key and washer will compare favorably in cost with the ordinary bolt nut and lock washer.

I attain my object by forming a bolt with a key slot the bolt being divided longitudinally from the head to the slot on a plane passing between the sides of the slot. This construction enables me to make the bolt by bending upon itself at the middle a suitably shaped blank. I thus avoid the necessity of cutting the slot, a slow and expensive process as punching, the only other practicable method of forming the slot, is inadmissible for reasons hereinafter given.

Figure 1 is a cross section of a rail joint provided with my improved key bolt. Fig. 2 is a perspective view of the bolt. Fig. 3 is a cross section of part of the bolt, showing the shape of the end of the slot. Fig. 4 is a cross section through the end of the bolt and key. Fig. 5 is a side elevation of the blank from which the bolt is formed. Fig. 6 is a side elevation of part of a modified form of blank. Fig. 7 is a cross section near the end of the blank. Fig. 8 is a cross section near the center of the blank.

In the drawings like letters of reference indicate corresponding parts in the different figures.

On reference to Figs. 1 and 2 it will be seen that my improved bolt is provided with a head A and a slot B through which passes a tapered key C. Without intending to restrict myself thereby in any way I show my invention as used in rail joints. When so used the bolt head engages one of the angle plates D and the key C preferably bears against a washer I bearing on the other angle plate D, though the washer may be omitted. The bolt passes through a hole in the rail E as shown. The end $d$ of the slot remote from the head of the bolt is formed on an incline against which one side of the tapered key C bears evenly, so that the other side will also bear evenly against the whole width of the washer I, or, if no washer be used, evenly over its whole length against the angle plate D. It will be noted that from the end F of the slot the bolt is divided on a plane G extending through the head of the bolt. This plane preferably passes axially through the bolt and is preferably substantially parallel to the sides of the slot B. The reason of this division will hereinafter be set forth. Each half of the bolt has a rib H, preferably wedge shaped formed on the outer or rounded side adjacent to the head and in a plane preferably at right angles to the division G. These ribs when the bolt is driven in place fit tightly in the angle plate D adjacent to the head and not only press the parts of the bolt tightly together but serve to prevent it turning when the key C is being bent, as hereinafter described. After the bolt has been inserted in the position shown the key C is driven into place by any suitable means setting up the joint as much as may be necessary. The smaller end of the key may then be bent as indicated in Fig. 4, or otherwise deformed to prevent any slackening of the key under the influence of vibration. Owing to the inclination of the end $d$ of the slot the key C must always be put in from the proper side. In order that this set may be instantly ascertained I prefer to form on one end of the bolt a teat $e$ which enables a workman by either touch or eye to place the bolts in the rail joint in uniform position so that the keys may all be inserted from the same side by the workman following with them. The peculiar split construction of the bolt is due to the method of manufacture. I find that cutting the key slot is too expensive for practical purposes and that it is impossible to punch a key slot in a bolt without materially weakening the bolt. The punching of bolts is also comparatively expensive and therefore I have devised the following method of construction.

From suitably rolled substantially half round bars blanks are formed such as shown in Fig. 5. Centrally of its round side this blank is provided with an excrescence of metal *b* which forms the end of the bolt remote from the head. Intermediate its ends the blank is reduced in cross-section for a distance substantially equal to twice the length of the slot *c*. This reduction is preferably made by making the bolt in cross-section less than a semi-circle. As the bolt is formed by bending the blank centrally to bring the faces of the blank into juxtaposition, the reduction in cross-section of the blank already referred to enables me to form the bolt about a suitable die to suitably shape the slot. If necessary a still further reduction of metal may be made below the excrescence *b* as indicated by the upward curve of the under side of the blank in Fig. 6. This avoids a surplus of metal just at each side of the excrescence *b* which would otherwise require to be got rid of or distributed in the subsequent steps in the formation of the bolt. Adjacent to each end of the blank on the curved side are provided excrescences *h* which in the process of manufacture furnish the metal for the ribs H of the finished bolt. The bolt is formed from the blank by bending the same while heated to bring its halves into juxtaposition, as already described, and the ends are formed by any suitable dies. The blank is of sufficient length to provide material which may be upset to form the bolt head G. By this process of forming the bolt I do not weaken the material in any way and the whole bolt with the key C may be formed at much less cost than the present nut and the bolt. I find also that, owing to the inner or flat sides of my blanks being rolled, the fiber of the metal lying ultimately along the sides of the slot is toughened and strengthened to such an extent that it has been found that the keys may be driven until they bend crescent shape in the plane of their width without stretching the sides of the slot in the slightest or shearing the smaller end of the bolt.

What I claim as my invention is:—

1. A bolt having a key-slot formed therein adjacent to one end and having a longitudinal division extending from the other end of the bolt to the end of the slot, the end of the slot nearest the end of the bolt being beveled, in combination with a wedge, having one side inclined at the same angle as the beveled end of the slot and the other substantially at right angles to the axis of the bolt.

2. A bolt having a stem whose cross-sectional surface contours are substantially similar from end to end, and comprising two similar parallel parts integrally connected only at the end remote from the head of the bolt and having recesses formed in the adjacent faces of their stem portions which recesses together form a key slot, the half sections of the bolt where the recess is formed being substantially circular segments less than a semi-circle.

3. A bolt comprising a head and stem having a key slot in the stem formed with a beveled outer end; the bolt having a teat formed on its head having a predetermined position relative to the ends of the slot, in combination with a wedge having one side inclined at the same angle as the beveled end of the slot, the aforesaid teat serving to indicate the proper side of entrance for the wedge.

4. A bolt formed in two longitudinal parts integrally connected at one end and having a key-slot formed between its parts, each part also having half of the bolt head formed thereon; and a rib extending from the half-bolt head partly toward the other end of the bolt in a plane substantially at right angles to the plane of the division between the two parts of the bolt.

5. A blank for the formation of a slotted bolt comprising a substantially half round bar reduced in cross section intermediate the ends for a distance substantially equal to twice the length of the desired slot.

6. A blank for the formation of a slotted bolt comprising a substantially half round bar reduced in cross section intermediate the ends for a distance substantially equal to twice the length of the desired slot and an excrescence of metal located at the middle of the round side of the bar to form one end of the bolt.

7. A blank for the formation of a slotted bolt comprising a substantially half round bar reduced in cross section intermediate the ends for a distance substantially equal to twice the length of the desired slot and a rib formed at each end of the blank at the crown of the round side of the blank.

Toronto, this 31st day of May 1909.

FREDERICK L. H. SIMS.

Signed in the presence of—
J. EDW. MAYBEE,
F. M. MCKENDRICK.